(12) United States Patent
Kiel et al.

(10) Patent No.: US 7,815,255 B1
(45) Date of Patent: Oct. 19, 2010

(54) SEAT FOR COMBAT VEHICLE

(75) Inventors: Thomas J. Kiel, Bernardsville, NJ (US);
Louis John Gaston, Sarver, NJ (US);
Frank C. Dlubak, Freeport, PA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 269 days.

(21) Appl. No.: 12/175,661

(22) Filed: Jul. 18, 2008

(51) Int. Cl.
*B60N 2/42* (2006.01)
*B60R 21/00* (2006.01)

(52) U.S. Cl. .............. 297/216.1; 297/273; 297/276; 297/281

(58) Field of Classification Search .......... 297/216.1, 297/248, 273, 276, 281
See application file for complete search history.

(56) References Cited

U.S. PATENT DOCUMENTS

| | | | | | |
|---|---|---|---|---|---|
| 63,911 | A | * | 4/1867 | Lupton | 297/276 |
| 135,018 | A | * | 1/1873 | Strassle | 297/276 |
| 235,758 | A | * | 12/1880 | Forster | 297/276 |
| 483,270 | A | * | 9/1892 | Tothill | 297/276 |
| 597,991 | A | * | 1/1898 | Lease | 297/276 |
| 703,458 | A | * | 7/1902 | Perkins | 297/276 |
| 1,066,991 | A | * | 7/1913 | Brogley | 297/276 |
| 1,369,799 | A | * | 3/1921 | Gardner | 297/276 |
| 1,390,502 | A | * | 9/1921 | Clouser | 297/276 |
| 1,393,774 | A | * | 10/1921 | Gushman | 297/276 |
| 1,396,774 | A | * | 11/1921 | Neiswender et al. | 297/276 X |
| 1,414,318 | A | * | 4/1922 | Wrye | 297/276 |
| 1,503,493 | A | * | 8/1924 | Eiffe | 297/276 X |
| 2,442,375 | A | * | 6/1948 | Paxton | 297/216.1 X |
| 2,545,571 | A | * | 3/1951 | Charn | 297/276 X |
| 2,556,076 | A | * | 6/1951 | Evan et al. | 5/9.1 |
| 2,556,077 | A | * | 6/1951 | Fetterly et al. | 5/9.1 |
| 2,600,675 | A | * | 6/1952 | Nelson | 297/276 |
| 2,685,912 | A | * | 8/1954 | Evans et al. | 248/240.2 |
| 2,700,412 | A | * | 1/1955 | Evans et al. | 297/232 |
| 2,829,702 | A | * | 4/1958 | Keating | 297/183.9 |
| 3,314,720 | A | * | 4/1967 | Millington et al. | 297/216.1 |
| 3,868,143 | A | * | 2/1975 | Reilly | 297/216.17 |
| 4,345,790 | A | * | 8/1982 | Coe | 297/276 X |
| 4,408,738 | A | * | 10/1983 | Mazelsky | 297/216.16 X |
| 4,437,629 | A | * | 3/1984 | Roine | 244/122 R |
| 4,474,347 | A | * | 10/1984 | Mazelsky | 297/216.1 X |
| 4,563,023 | A | * | 1/1986 | Clarkson | 280/748 |
| 4,738,413 | A | * | 4/1988 | Spinosa et al. | 244/151 R |
| 4,923,147 | A | * | 5/1990 | Adams et al. | 244/122 AG |
| 5,085,487 | A | * | 2/1992 | Weingartner et al. | 297/452.1 |
| 5,283,918 | A | * | 2/1994 | Weingartner et al. | 297/281 X |
| 5,379,725 | A | * | 1/1995 | Roberson et al. | 119/770 |
| 5,564,144 | A | * | 10/1996 | Weingartner et al. | 297/452.27 |
| 5,632,053 | A | * | 5/1997 | Weingartner et al. | 5/655.9 |

(Continued)

*Primary Examiner*—Rodney B White
(74) *Attorney, Agent, or Firm*—John F. Moran

(57) ABSTRACT

A seat for a combat vehicle includes a generally rectangular rigid base including front and rear ribs disposed on opposite, longer sides of the base, the base including a pair of slot openings disposed adjacent opposite, shorter sides of the base; a generally rectangular inner cushion disposed on a top surface of the base; a generally U-shaped outer cushion disposed on a top surface of the inner cushion and along outer surfaces of the front and rear ribs; a cover disposed over the outer cushion; and a pair of support assemblies for supporting the seat in the vehicle.

18 Claims, 6 Drawing Sheets

U.S. PATENT DOCUMENTS

| | | | |
|---|---|---|---|
| 6,378,939 B1 * | 4/2002 | Knoll et al. | 297/216.1 |
| 6,409,243 B1 * | 6/2002 | Hansen | 297/216.17 X |
| 6,446,910 B1 * | 9/2002 | Knoll et al. | 244/122 R |
| 6,913,314 B2 * | 7/2005 | Hansen | 297/216.1 |
| 7,513,558 B2 * | 4/2009 | Hansen | 296/68.1 |
| 2010/0084897 A1 * | 4/2010 | Greenwood | 297/217.7 |
| 2010/0084907 A1 * | 4/2010 | Greenwood et al. | 297/483 |

* cited by examiner

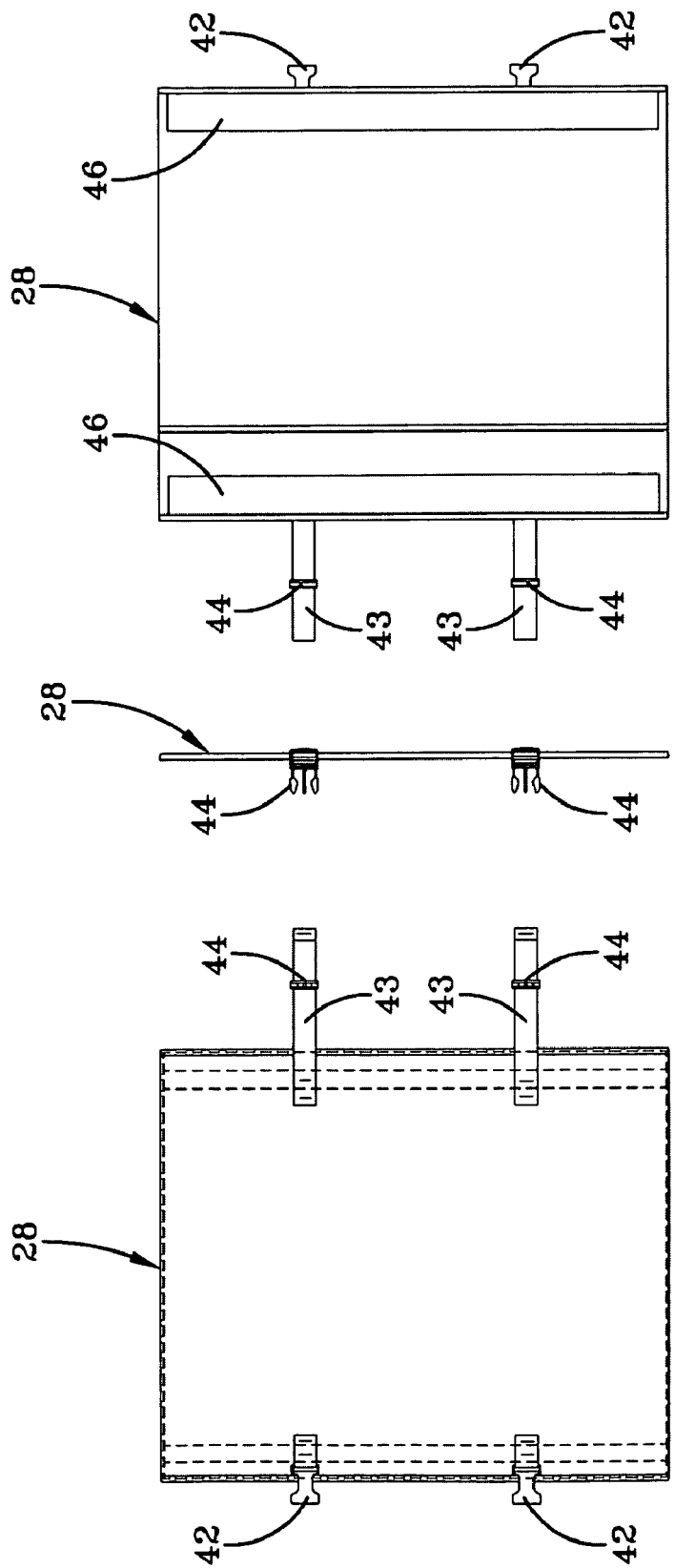

US 7,815,255 B1

SEAT FOR COMBAT VEHICLE

STATEMENT OF GOVERNMENT INTEREST

The inventions described herein may be manufactured, used and licensed by or for the U.S. Government for U.S. Government purposes.

BACKGROUND OF THE INVENTION

The invention relates in general to combat vehicles and in particular to a seat for a combat vehicle.

Various tactical vehicles, light armored vehicles and tanks are equipped with weapons mounted on a top surface of the vehicle, typically on a rotating turret. A hatch is provided on the turret so that a soldier inside the vehicle may open the hatch and operate the weapon from inside the vehicle. The upper portion of the soldier's body extends through the hatch opening. The soldier may assume a standing position and/or a seat may be provided. Existing seats are hammock-like arrangements with supporting cords on the edges. The bottoms of the user's upper legs bear down on the supporting cords causing stress, discomfort and eventually numbness. This is a very dangerous condition because the user may not be able to move effectively. Thus, an improved seat is needed.

SUMMARY OF THE INVENTION

It is an object of the invention to provide a seat for a combat vehicle that is comfortable and minimizes many physical problems associated with prolonged sitting.

It is another object of the invention to provide a seat for a combat vehicle that provides for an immediate drop into the safety of the vehicle cabin.

One aspect of the invention is a seat comprising a generally rectangular rigid base including front and rear ribs disposed on opposite, longer sides of the base, the base including a pair of slot openings disposed adjacent opposite, shorter sides of the base; first strips comprising a first portion of a hook and loop fastener, the first strips being attached to interior surfaces of the front and rear ribs; a generally rectangular inner cushion disposed on a top surface of the base; a generally U-shaped outer cushion disposed on a top surface of the inner cushion and along outer surfaces of the front and rear ribs; a cover disposed over the outer cushion; and second strips comprising a second portion of a hook and loop fastener, the second strips being attached to a bottom surface of the cover and mating with the first strips.

The front and rear ribs may comprise generally rectangular shapes. The base may comprise aluminum. The inner cushion may comprise foam and the outer cushion may comprise viscoelastic foam.

The seat further comprises a pair of support assemblies for supporting the seat in a vehicle. Each support assembly comprises a base bracket disposed under the base of the seat; a first belt connected at one end to the base bracket and at another end to an adapter; a second belt connected at one end to the adapter and at another end to a quick release link; and a quick release snap hook removably attached to the quick release link.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIGS. 5A, 5B and 5C are top, side and bottom views, respectively, of the cover of FIG. 1.

DETAILED DESCRIPTION OF THE PREFERRED EMBODIMENTS

The invention is a multifunctional safety and comfort platform (seat) with application for gunners, scouts and vehicle commanders of various tactical vehicles, light armored vehicles and tanks. The inventive seat is configured for extreme comfort and military operational functionality. The seat helps to minimize fatigue, discomfort and physiologic degradation associated with vascular, lymphatic and neurologic compression deficits. Thus, maximum functionality and physical endurance is sustained, thereby allowing soldiers and marines to safely complete mission objectives effectively.

Figure 1:
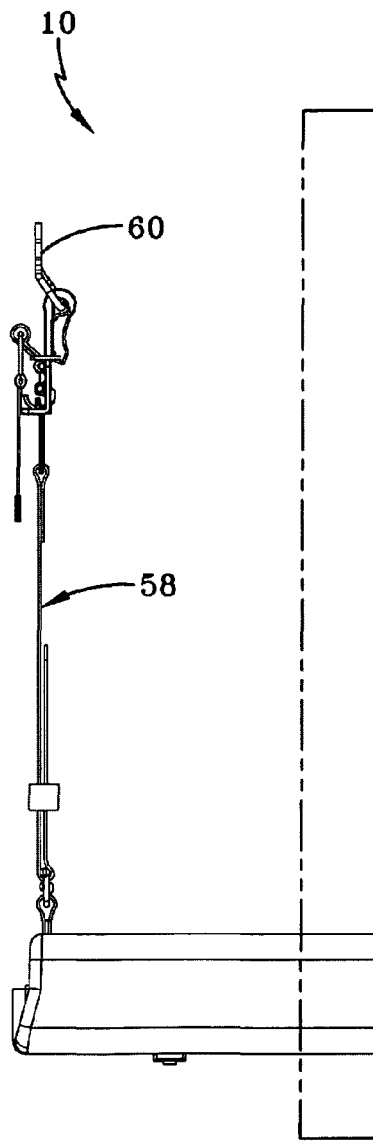
FIG. 1 is a front view of one embodiment of a seat in accordance with the invention.
Figure 3:
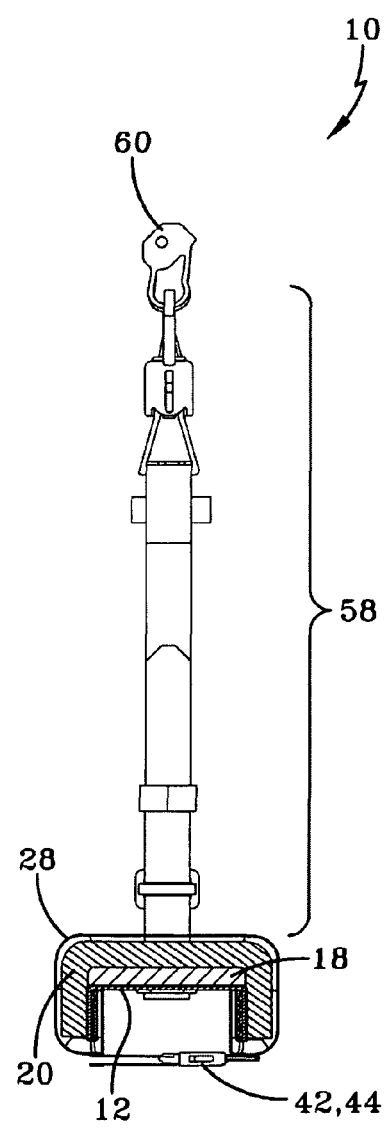
FIG. 3 is a sectional view taken along the line 3-3 of FIG. 1.
Figure 2:
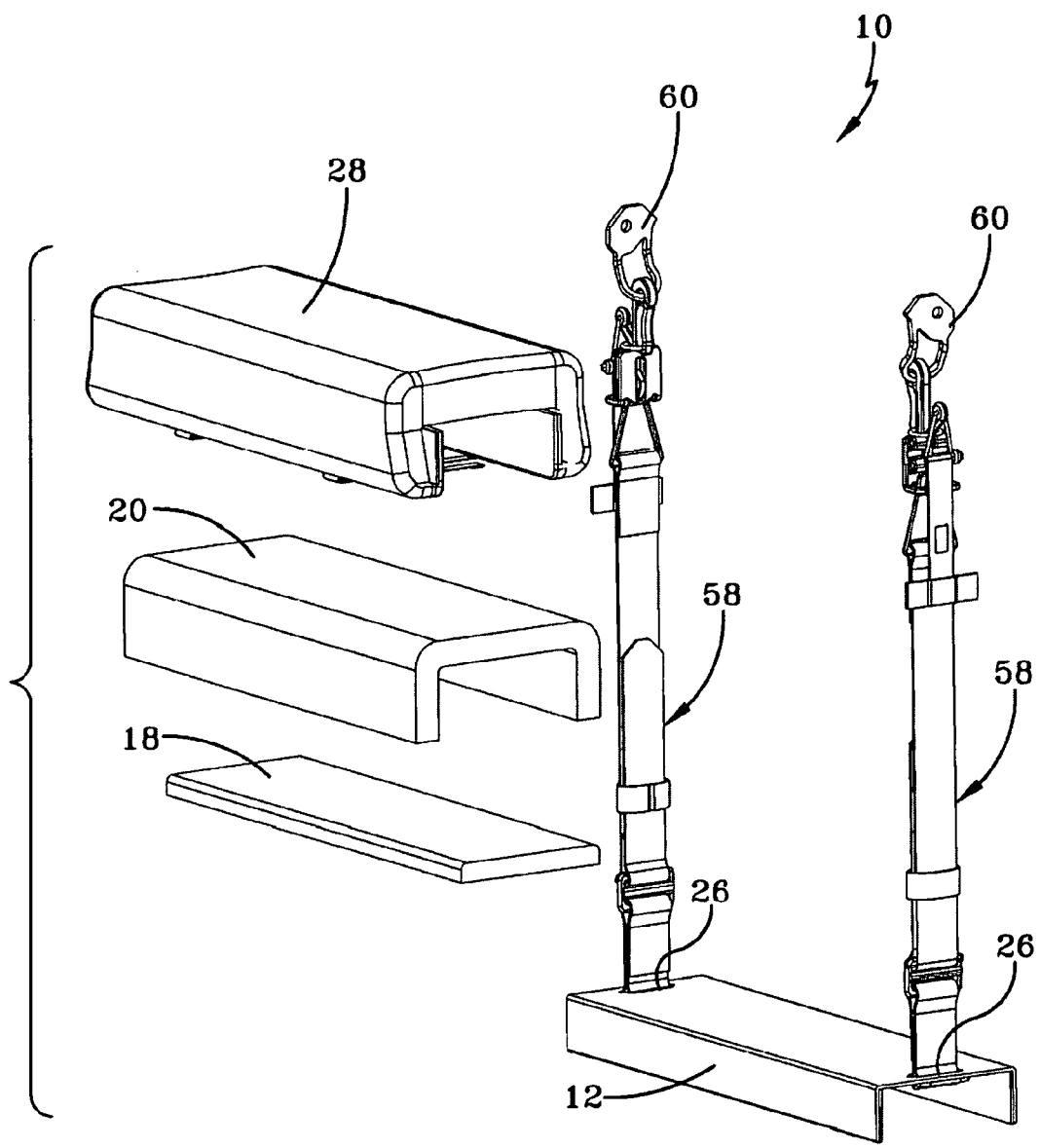
FIG. 2 is an exploded, perspective view of the seat of FIG. 1.

FIG. 1 is a front view of one embodiment of a seat 10 in accordance with the invention. FIG. 2 is an exploded, perspective view of the seat 10 of FIG. 1. FIG. 3 is a sectional view taken along the line 3-3 of FIG. 1. Seat 10 comprises a generally rectangular rigid base 12, a generally rectangular inner cushion 18 disposed on a top surface of the base 10, a generally U-shaped outer cushion 20 disposed on a top surface of the inner cushion 18 and a cover 28 disposed over the outer cushion 20. A pair of support assemblies 58 connects the base 12 to brackets 60 that are fixed to the combat vehicle (not shown).

Figure 4A:
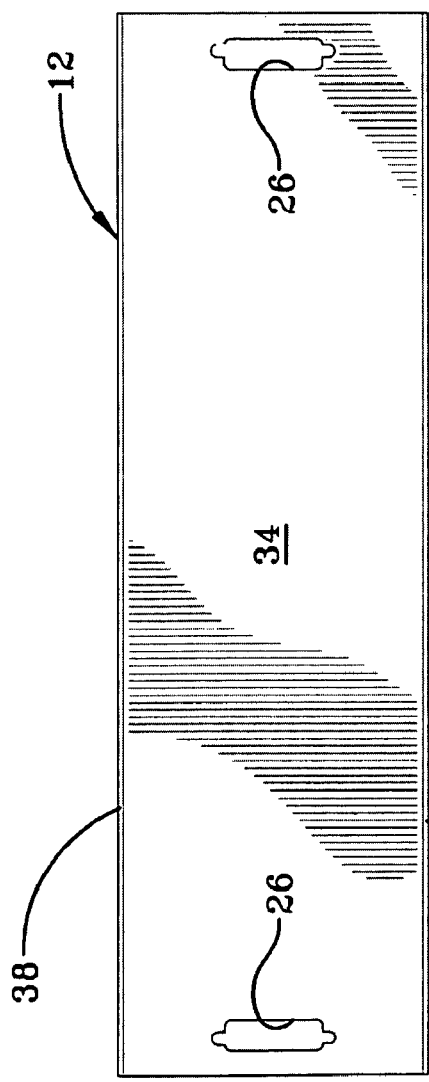
FIGS. 4A, 4B and 4C are top, side and end views, respectively, of the base of FIG. 1.
Figure 4B:
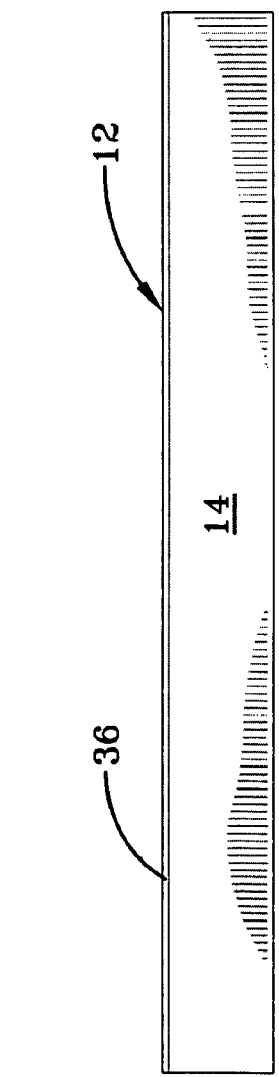
Figure 4C:
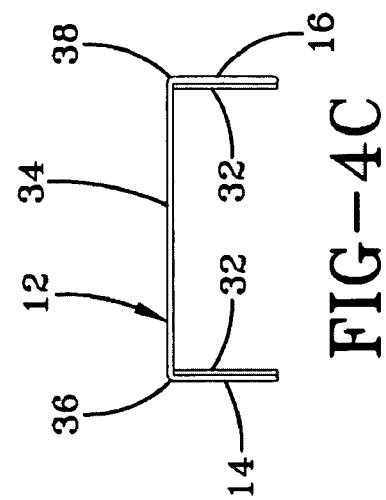

FIGS. 4A, 4B and 4C are top, side and end views, respectively, of the base 12 of FIG. 1. Base 12 includes a top surface 34 and front and rear ribs 14, 16 (FIG. 4C) disposed on opposite, longer sides of the base 12. A pair of slot openings 26 (FIG. 4A) are disposed adjacent the opposite, shorter sides of the base 12. Base 12 is the supporting structure for seat 10 and preferably comprises aluminum, for example, 6063T5/T6 extruded, powder coated aluminum material. The front and rear ribs 14, 16 increase the rigidity of the seat 10, while adding minimal weight. The ribs 14, 16 are generally rectangular shapes that may comprise the same material as the base 12. Edges 36, 38 of the base 12 include smooth radii to reduce neurovascular compression. The two slot openings 26 are for the support assemblies 58, discussed in more detail below.

Referring again to FIG. 1, inner cushion 18 is generally rectangular and comprises, for example, formulation 210 HDHR foam designed for shock absorption. The shock absorbing inner layer 18 is very important to the functionality of the seat 10. In a preferred embodiment, the inner cushion 18 has a density of 7.2 lb per cubic foot; indention forced deflection of 60 lb.; support factor/compression modulus of 2.72 to avoid "bottoming out"; airflow through cellular structures of 0.9 cubic feet per minute @ 125 Pascals; tensile strength of 20.4 lbs @ 20 inches/minute crosshead with 95% elongation at 20 inches/minute crosshead. The inner cushion 18 meets or exceeds flammability standards.

Outer cushion 20 is generally U-shaped and comprises, for example, formulation 204 viscoelastic foam designed for comfort. Outer cushion 20 has a density of 5+lb per cubic foot; indention forced deflection of 45 lb; airflow of 1.7 cubic feet @ 125 Pascals; tensile strength of 17 lbs and elongation of 121%. In combination, the inner and outer cushions 18, 20 significantly reduce compression of the gluteal and hamstring muscles along with the pelvic ischial tuberosities and femoral structures. This results in maximum comfort and support. The viscoelastic foam of the outer cushion 20 has an indirect, yet positive, influence on flow in the veins, arteries and lymph vessels. As well, the outer cushion 20 minimizes microtrauma to the spine, sciatic nerve and supporting tissues. This limits physiologic degradation and maximizes functionality. Additionally, by decreasing pressure on the deep veins, the viscoelastic foam reduces the chance of developing deep vein thrombophlebitis (DVT), which is a blood clot in the deep veins of the leg. In addition to covering the top surface of the inner cushion 18, the outer cushion 20 covers the outer surfaces of the ribs 14, 16 (FIG. 4C). Covering the outer surfaces of the ribs 14, 16 pads the curved edge of the base 12 and increases the body surface contact area. The end result is the maximum in comfort, support and physiologic optimization.

FIGS. 5A, 5B and 5C are top, side and bottom views, respectively, of the cover 28 of FIG. 1. In FIGS. 5A-C, the cover 28 is in an unfolded (flat) state. Cover 28 forms a generally U-shape when disposed over the outer cushion 20. Cover 28 preferably comprises an ACU digital pattern, heavy duty, water resistant cordura nylon material that is machine washable. Fasteners, such as hook and loop fasteners, are used to attach the cover 28 to the base 12. Strips 32 (FIG. 4C) comprising a first portion (either the hook or loop portion) of a hook and loop fastener are attached to interior surfaces of the front and rear ribs 14, 16 of the base 12. On the bottom surface 40 (FIG. 5C) of cover 28 are strips 46 comprising a second portion (either the hook or loop portion) of a hook and loop fastener. Strips 46 are located adjacent opposite edges of the bottom 40 of cover 28. When the cover 28 is placed over the outer cushion 20, the strips 46 fold under the base 12 and mate with the strips 32 on the ribs 14, 16. An additional means to secure the cover 28 are buckles. One or more female buckles 42 attached to cover 28 mate with one or more male buckles 44 attached to straps 43 attached to cover 28. The buckles 42, 44 connect on the underside of base 12 (FIG. 3).

Figure 6:
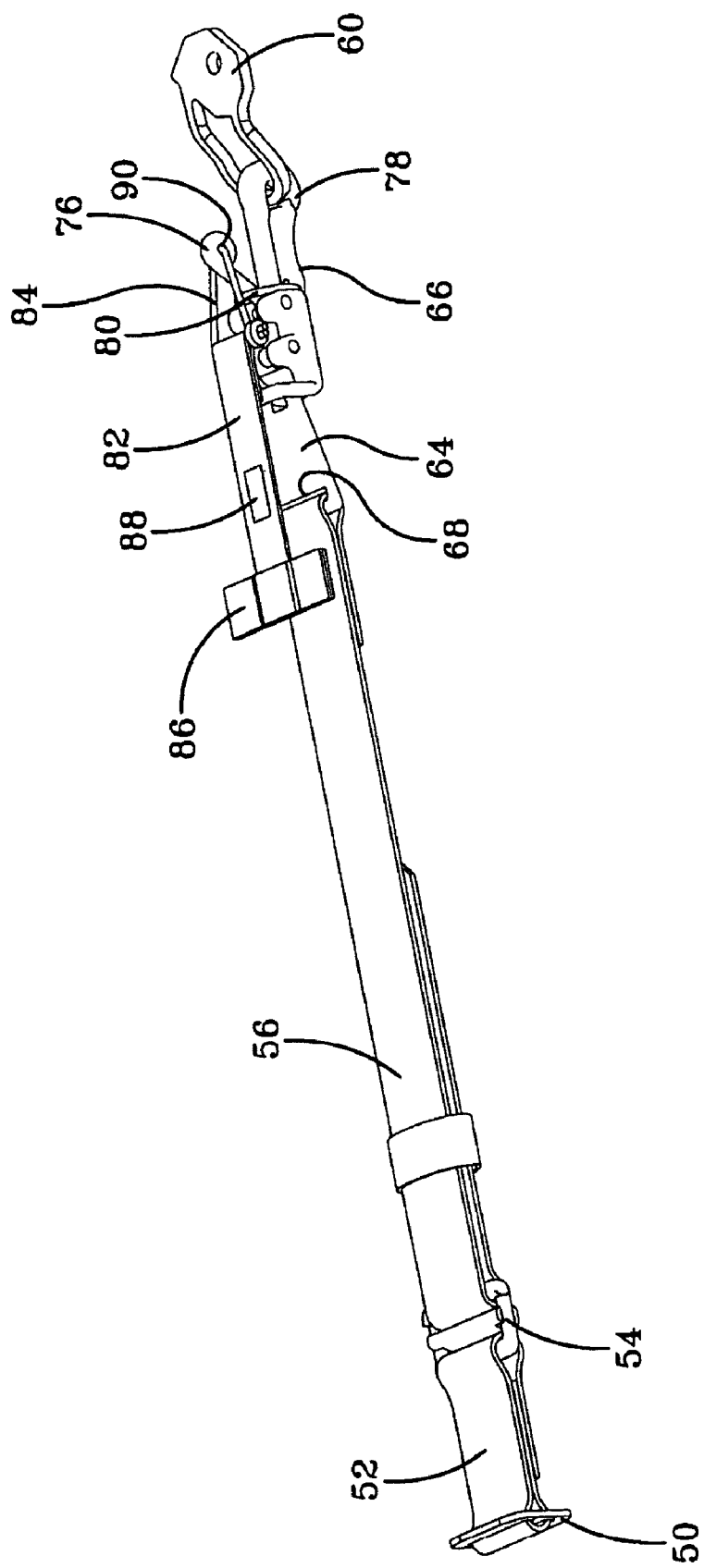
FIG. 6 is a perspective view of a support assembly.
Figure 7:
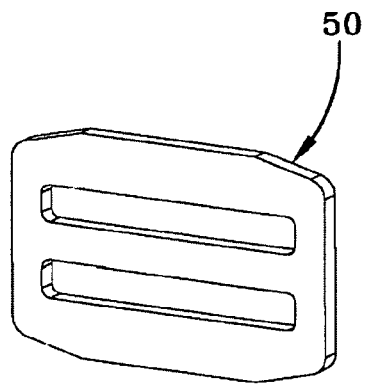
FIG. 7 is a perspective view of a base bracket.
Figure 8:
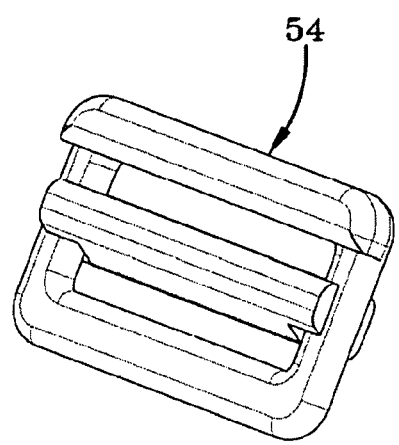
FIG. 8 is a perspective view of an adapter.

Seat 10 is configured to suspend from the hatch or turret opening in an armored or tactical vehicle. The support assemblies 58 (FIGS. 1-3) connect the base 12 to brackets 60 fixed to the vehicle. FIG. 6 is a perspective view of a support assembly 58. Support assembly 58 includes a short belt 52 woven through a base bracket 50 (FIG. 7) and an adapter 54 (FIG. 8). The base bracket 50, when turned on its edge, fits through the slot opening 26 in base 12 (FIG. 2). The base bracket 50 is then rotated so that it bears against the bottom of the base 12. A long belt 56 is also woven through the adapter 54 and is adjustable in length to accommodate various heights and vertical positions of gunners and scouts. Excess belt 56 is secured with an elastic band 62. Belts 52, 56 may comprise nylon webbing.

Figure 9:
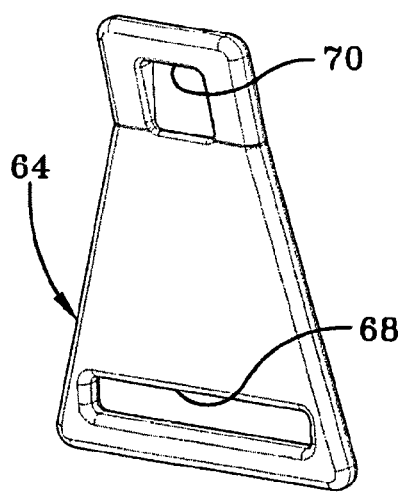
FIG. 9 is a perspective view of a quick release link.
Figure 10:
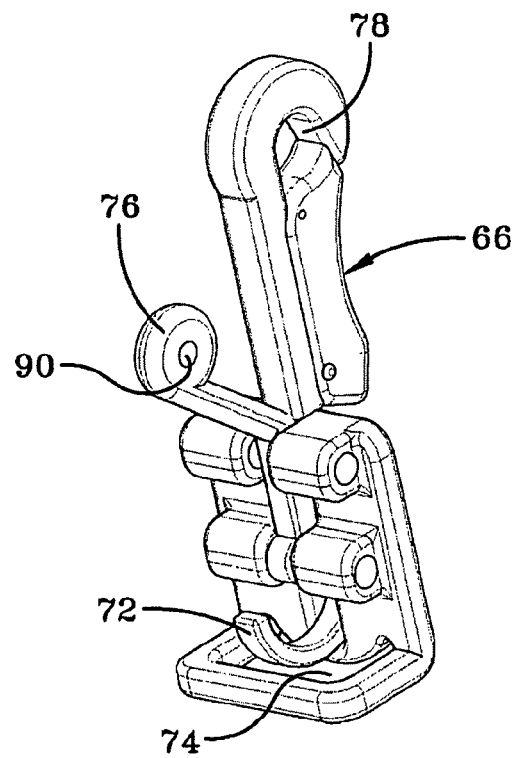
FIG. 10 is a perspective view of a quick release snap hook.

The upper end of long belt 56 is woven through the belt opening 68 in the quick release link 64 (FIG. 9). The top portion of the quick release link 64 is inserted in a link opening 74 (FIG. 10) in the quick release snap hook 66 such that the curved hook 72 engages the hook opening 70 in the quick release link 64. Snap hook 66 attaches to bracket 60 (FIG. 6) via bracket clip 78. Curved hook 72 may be disengaged from the link 64 by pulling on release lever 76 (FIGS. 6 and 10). The release link 64 and snap hook 66 allow the user to quickly drop from the hatch area during a vehicle rollover event or other emergency situation.

Referring again to FIG. 6, each support assembly 58 includes a brightly colored, reflective lanyard 82 as a means of engaging the quick release system. The lanyard may be pulled by the user of the seat 10 or any other vehicle occupant. Lanyard 82 may comprise stitched nylon webbing. A loop in lanyard 82 receives a cord 84 that fits through an opening 90 (FIG. 10) in quick release lever 76. The other end of lanyard 82 comprises a handle 86 in the form of webbing stitched perpendicular to the rest of lanyard 82. Lanyard 82 may include 8-hour photoluminescent strips 88 for easy localization in darkness. The support assemblies 58 are released from the snap hooks 66 by grasping lanyard handles 86 and pulling.

To prevent accidentally releasing the support assemblies 58, one or more O-rings 80 (FIG. 6) may be positioned over the quick release lever 76 (FIG. 10). The O-ring 80 provides resistance to the movement of lever 76. The number and stiffness of the O-rings 80 determine the ease with which the lever 76 may be moved.

The fully adjustable seat 10 permits enhanced surveillance postures, particularly when employed in conjunction with transparent or metal armored turrets. The quick release attachment point (bracket 60) also functions as a means to hang an intravenous bag for medical emergencies. Seat 10 pivots from front to back, allowing a tilt capability that enables the user to quickly slide forward and downward to enter the vehicle. The seat 10 also assists the user with egress from the vehicle in that the rigid base 12 allows for a sturdy and secure platform, which acts as a step when exiting the vehicle through the hatch. An exemplary seat is about 21 inches long, about 6 inches wide and weights about eight pounds. The seat width allows for unencumbered access to personal weapons, pockets and attached tactical gear.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A seat, comprising:
    a generally rectangular rigid base including front and rear ribs disposed on opposite, longer sides of the base, the base including a pair of slot openings disposed adjacent opposite, shorter sides of the base;
    first strips comprising a first portion of a hook and loop fastener, the first strips being attached to interior surfaces of the front and rear ribs;
    a generally rectangular inner cushion disposed on a top surface of the base;
    a generally U-shaped outer cushion disposed on a top surface of the inner cushion and along outer surfaces of the front and rear ribs;
    a cover disposed over the outer cushion; and
    second strips comprising a second portion of a hook and loop fastener, the second strips being attached to a bottom surface of the cover and mating with the first strips.

2. The seat of claim 1 wherein the front and rear ribs comprise generally rectangular shapes.

3. The seat of claim 1 wherein the base comprises aluminum.

4. The seat of claim 1 wherein front and rear top edges of the base are rounded.

5. The seat of claim 1 wherein the inner cushion comprises foam.

6. The seat of claim 5 wherein the inner cushion has a density of 7.2 lb per cubic foot.

7. The seat of claim 5 wherein the inner cushion has an indention forced deflection of 60 lb.

8. The seat of claim 5 wherein the inner cushion has a support factor/compression modulus of 2.72.

9. The seat of claim 5 wherein the inner cushion has airflow through cellular structures of 0.9 cubic feet per minute @ 125 Pascals.

10. The seat of claim 5 wherein the inner cushion has a tensile strength of 20.4 lbs @ 20 inches/minute crosshead with 95% elongation at 20 inches/minute crosshead.

11. The seat of claim 1 wherein the outer cushion comprises viscoelastic foam.

12. The seat of claim 1 further comprising a pair of support assemblies for supporting the seat in a vehicle.

13. The seat of claim 12 wherein each support assembly comprises a base bracket disposed under the base of the seat; a first belt connected at one end to the base bracket and at another end to an adapter; a second belt connected at one end to the adapter and at another end to a quick release link; and a quick release snap hook removably attached to the quick release link.

14. The seat of claim 13 wherein the quick release snap hook includes a lever for releasing the quick release link.

15. The seat of claim 14 further comprising a lanyard connected to the lever.

16. The seat of claim 15 wherein the lanyard includes a handle.

17. The seat of claim 14 further comprising an O-ring disposed over the lever.

18. The seat of claim 12 further comprising a pair of brackets attached to the vehicle wherein the pair of support assemblies are attached to the pair of brackets.

* * * * *